(12) United States Patent
Zhou et al.

(10) Patent No.: US 9,405,082 B2
(45) Date of Patent: Aug. 2, 2016

(54) OSA CAGE WITH REINFORCED CONNECTION TO PCB

(71) Applicant: Lumentum Operations LLC, Milpitas, CA (US)

(72) Inventors: Rui Zhou, Mountain View, CA (US); Boping Xie, San Ramon, CA (US)

(73) Assignee: Lumentum Operations LLC, Milpitas, CA (US)

( * ) Notice: Subject to any disclaimer, the term of this patent is extended or adjusted under 35 U.S.C. 154(b) by 250 days.

(21) Appl. No.: 14/038,500

(22) Filed: Sep. 26, 2013

(65) Prior Publication Data

US 2015/0086208 A1   Mar. 26, 2015

(51) Int. Cl.
*G02B 6/42* (2006.01)
*H04B 10/40* (2013.01)
*H04B 10/2575* (2013.01)

(52) U.S. Cl.
CPC .............. *G02B 6/4246* (2013.01); *G02B 6/426* (2013.01); *G02B 6/428* (2013.01); *G02B 6/4284* (2013.01); *H04B 10/2575* (2013.01); *H04B 10/40* (2013.01); *G02B 6/4277* (2013.01)

(58) Field of Classification Search
CPC ... G02B 6/4201; G02B 6/4245; G02B 6/4261
See application file for complete search history.

(56) References Cited

U.S. PATENT DOCUMENTS

| | | | |
|---|---|---|---|
| 6,499,889 B1 * | 12/2002 | Shirakawa | G02B 6/3817 257/99 |
| 6,617,518 B2 * | 9/2003 | Ames | H01R 12/592 174/254 |
| 7,210,862 B2 * | 5/2007 | Yoshikawa | H01L 23/4093 257/E23.086 |
| 2008/0050122 A1 * | 2/2008 | Ozaki | G02B 6/4246 398/139 |

* cited by examiner

*Primary Examiner* — Michelle R Connelly
(74) *Attorney, Agent, or Firm* — Harrity & Harrity, LLP

(57) ABSTRACT

Direct pin attachment is the most compact method to connect the OSA and the PCBA, due to better performance in general and allows maximum PCBA space for more functionality. However, direct pin attachment can result in concentrated stress in the OSA-PCBA joint area, which can affect the reliability and yield of the module. To overcome the problem, an integrated transceiver cage and housing is provided including a direct pin attachment with reinforcing tabs, which are fixed to the PCBA prior to the pins to transfer any stress between the OSA and PCBA, thereby reducing the amount of stress applied to the pins.

20 Claims, 6 Drawing Sheets

OSA CAGE WITH REINFORCED CONNECTION TO PCB

TECHNICAL FIELD

The present invention relates to a transceiver assembly, and in particular to a compact and universal single frame design, which includes a reinforced direct pin attachment between the OSA and PCBA assembly.

BACKGROUND OF THE INVENTION

With reference to FIG. 1, a conventional SFP transceiver module 1 has an electrical interface 2, e.g. circuit board end connector, for the data path, and an optical interface 3, e.g. LC duplex optical connector. The optical connector 3 with a duplex LC port extends from one end of a housing (not shown), and the electrical connector 2 extends from the other end of the housing, and enables the transceiver 1 to be hot plugged into a host system.

Transmit electrical signals Tx− and Tx+ from a host computer device (not shown) enter the transceiver module 1 via the electrical connector 2, and are transmitted across a transmit (Tx) data path to a transmitter optical sub-assembly 11. The Tx data path includes electrical traces in a printed circuit board (PCB) 6, which transmit the transmit electrical signals to a laser driver 7, and from the laser driver 7 to TOSA leads, typically in the form of a flex cable lead 8 electrically connected with stub-leads 9. The stub-leads extend outwardly from a TOSA 11, which includes a ferrule 12 extending into the optical connector 3. The TOSA 11 converts the electrical signals Tx− and Tx+ to optical signals and transmits them across an optical link via an optical waveguide, e.g. optical fiber, to a matching transceiver.

Receiver optical signals from the optical link are received by a ferrule 13 extending from a receiver optical sub-assembly (ROSA) 14, which converts the optical signals into differential receiver electrical signals Rx− and Rx+. The receiver electrical signals Rx− and Rx+ are transmitted across a Rx data path, which includes ROSA leads, typically in the form of stub-leads 16, extending from the end of the ROSA 14, and a flex cable lead 17 extending between the end of the ROSA 14 and the PCB 6. The receiver electrical signals Rx− and Rx+ travel across the PCB 6, through a post amplifier 18 to the electrical connector 2 for transmission to the host device.

As the form factor of transceiver modules continues to get smaller, and the data rate keeps increasing, a more compact method to connect the OSA and the PCBA must be employed in order to make the most use of the inner space of a transceiver module. As a result, direct pin attachment is preferred over traditional flex attachment. However, direct pin attach can cause concentrated stress in OSA-PCBA joint area which affects the reliability and yield of the module.

Direct pin attachment is the most compact method to connect the OSA and the PCBA, due to better performance in general and allows maximum PCB space for more functionality. Because of the small footprint in direct pin attach, the OSA package size can be reduced, which makes future, lower-cost packages achievable.

However, direct pin attachment can result in concentrated stress in the OSA-PCBA joint area which can affect the reliability and yield of the module. The present invention significantly reduces the stress, therefore, improves the performance and reliability of the product.

An object of the present invention is to overcome the shortcomings of the prior art by providing an integrated transceiver cage and housing including a direct pin attachment to a PCB, and reinforcing tabs for fixing the cage to the PCB minimizing the stress on the direct pin attachment.

SUMMARY OF THE INVENTION

Accordingly, the present invention relates to a cage for at least one optical subassembly comprising:

a housing comprising a cover, and first and second sidewalls for covering a first optical subassembly (OSA);

first and second tabs extending from the first and second sidewalls, respectively, for receiving an edge of a printed circuit board assembly (PCBA), which is electrically coupled to the first OSA; and spring clips extending from the housing for holding the first OSA in the housing.

Another aspect of the present invention relates to a transceiver comprising:

a transmitter optical subassembly (TOSA) for converting electrical signals into optical signals, and transmitting the optical signals to an optical network, the TOSA including electrical leads extending therefrom;

a receiver optical subassembly (ROSA) for converting optical signals into electrical signals, and transmitting the electrical signals to a host device, the ROSA including electrical leads extending therefrom;

a printed circuit board assembly (PCBA) including trace leads directly fixed to the electrical leads from the TOSA and the ROSA; and a cage comprising:

a housing including a cover, and first and second sidewalls for protecting the TOSA and ROSA; and first and second tabs, extending from the first and second sidewalls adjacent to the electrical leads from the TOSA and the ROSA, respectively, fixed to an edge of the PCBA.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
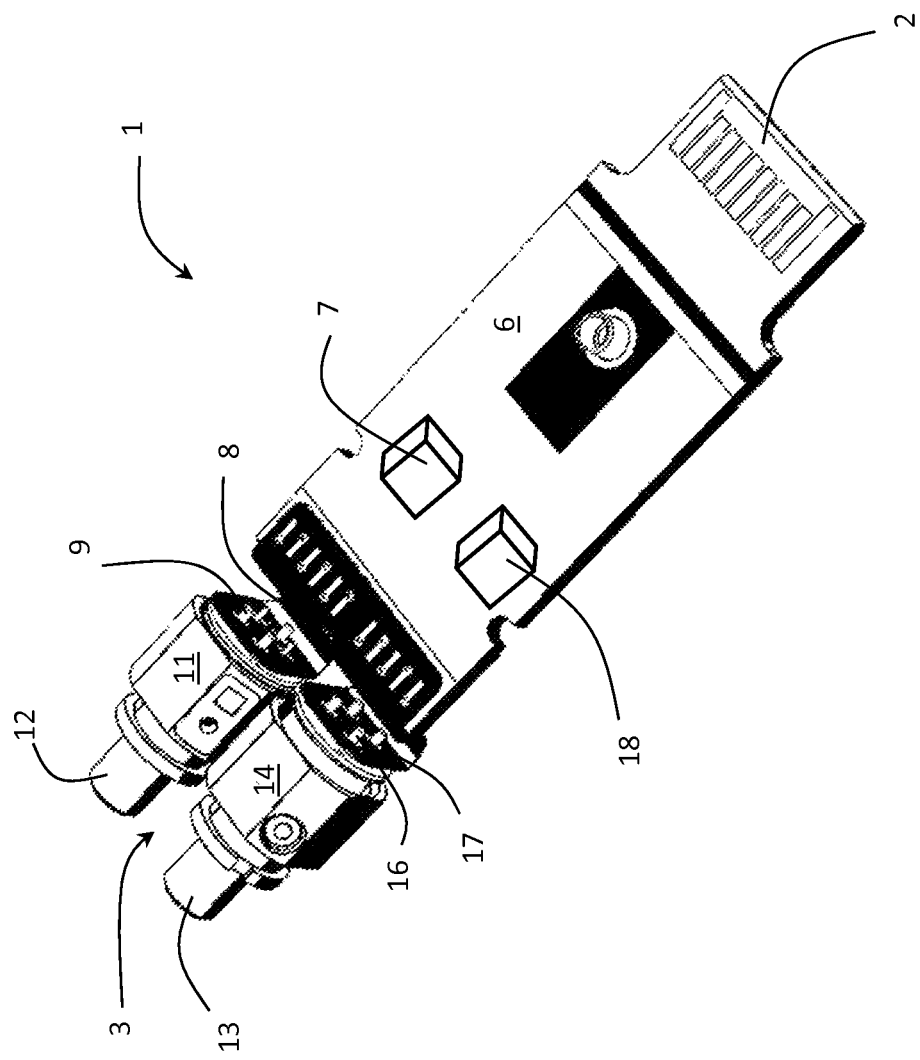
FIG. 1 is a plan view of a conventional transceiver assembly.
Figure 2:
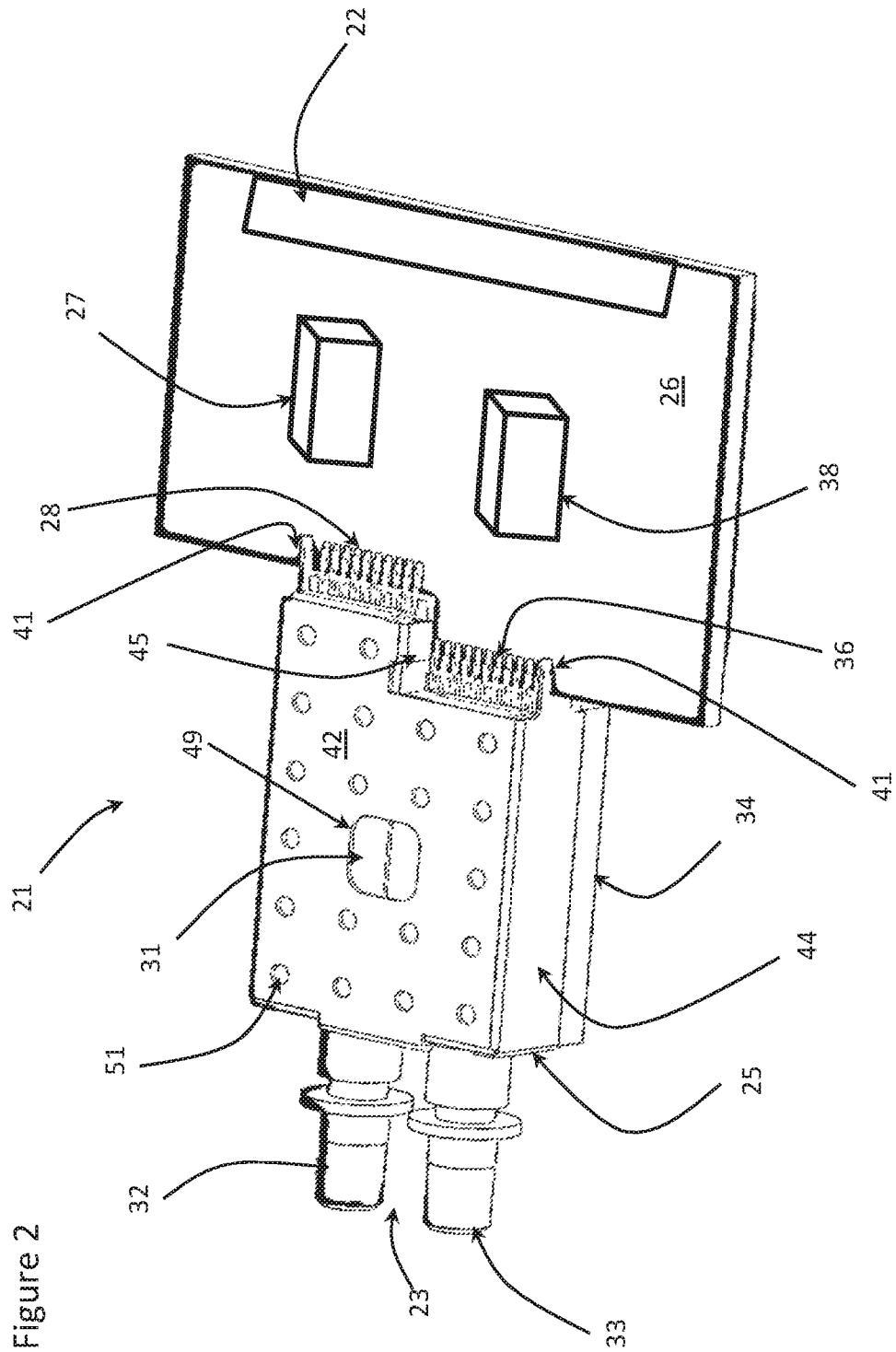
FIG. 2 is an isometric view of a transceiver assembly in accordance with the present invention.
Figure 3:
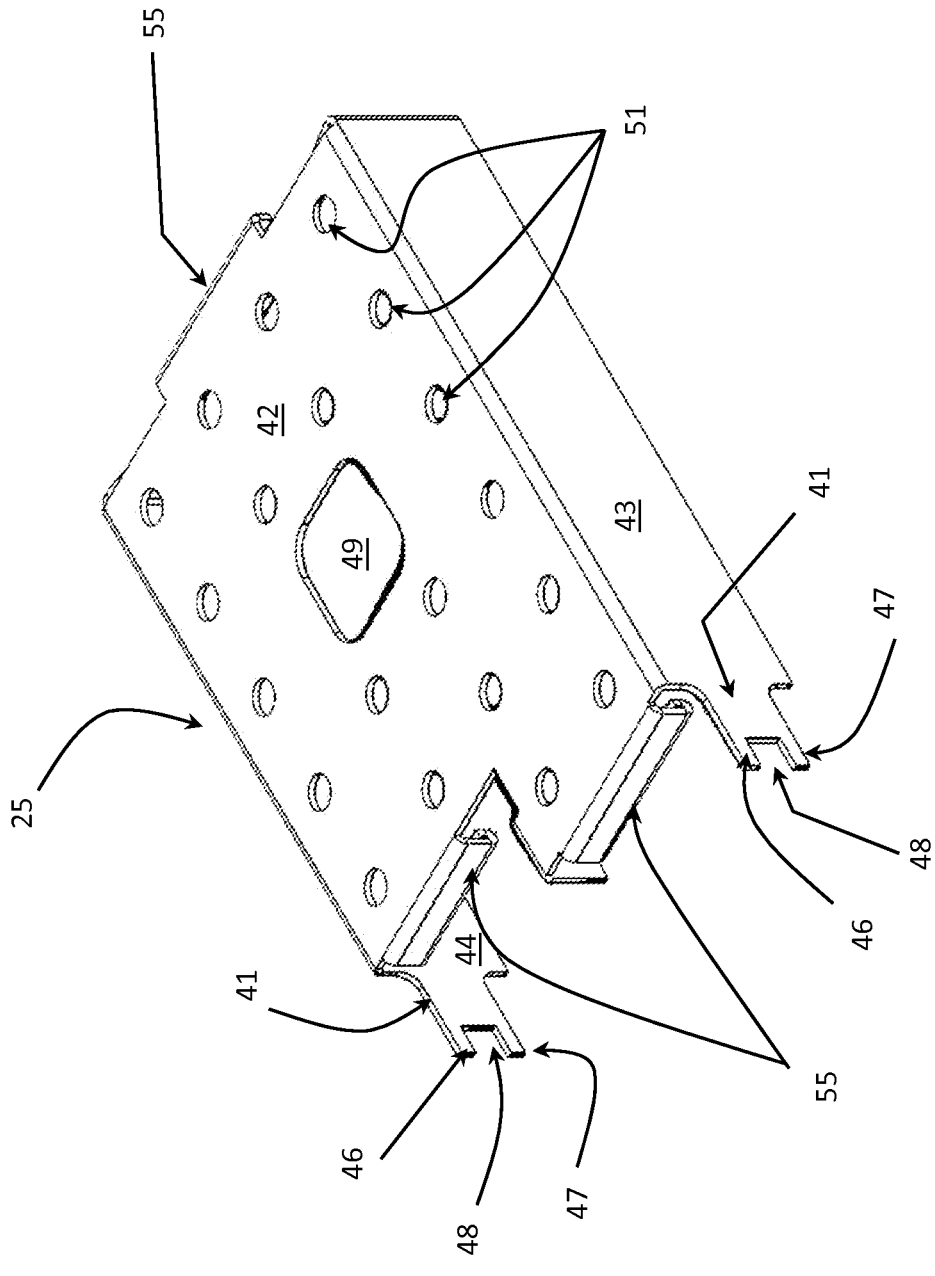
FIG. 3 is an isometric view of the OSA cage of FIG. 2.

With reference to FIGS. 2 and 3, transceiver module 21, in accordance with the present invention, includes an electrical interface 22, e.g. a circuit board end connector, for transmitting electrical data signals to and from the host computer system (not shown), and an optical interface 23, e.g. LC duplex optical connector, for transmitting optical signals to and from an optical network. The optical interface 23 extends from one end of an OSA cage 25, and the electrical interface 22 extends from the outer free end of a printed circuit board (PCB) 26, and enables the transceiver 21 to be hot plugged into the host computer system.

Transmit electrical signals Tx− and Tx+ from the host computer device enter the transceiver module 21 via the electrical interface 22, and are transmitted across a transmit (Tx) data path to a transmitter optical sub-assembly (TOSA) 31. The Tx data path includes electrical traces in the PCB 26, which transmit the transmit electrical signals to a laser driver 27, and from the laser driver 27 to TOSA pin leads 28, directly connected to the traces in the PCBA 26. The TOSA pin leads 28 extend outwardly from the TOSA 31, which also includes a ferrule 32 extending into the optical interface 23. The TOSA 31 converts the electrical signals Tx− and Tx+ to optical signals and transmits them across an optical link via an optical waveguide, e.g. optical fiber, to a remotely located transceiver.

Receiver optical signals from the optical link are received by a ferrule 33 extending from a receiver optical sub-assembly (ROSA) 34, which converts the optical signals into differential receiver electrical signals Rx− and Rx+. The receiver electrical signals Rx− and Rx+ are transmitted across a Rx data path, which includes ROSA pin leads 36, extending from the end of the ROSA 34 fixed directly to trace leads in the PCBA 26. The receiver electrical signals Rx− and Rx+ travel across the PCB 26, through various post processing and testing elements, e.g. a post amplifier 38, to the electrical connector 22 for transmission to the host device.

The OSA cage 25 is designed to cover and hold the TOSA 31 and the ROSA 34 relative to each other therein, but not cover the PCBA 26, which includes the electrical control systems, e.g. laser driver 27 and post amplifier 38. The OSA cage 25 also enables attachment of the PCBA 26 via soldering tabs 41, which comprise a material, which is stronger than the OSA pins 28 and 36, e.g. metal or polymer. To reduce the cost, the OSA cage 25 is preferably formed from sheet metal.

Figure 4:
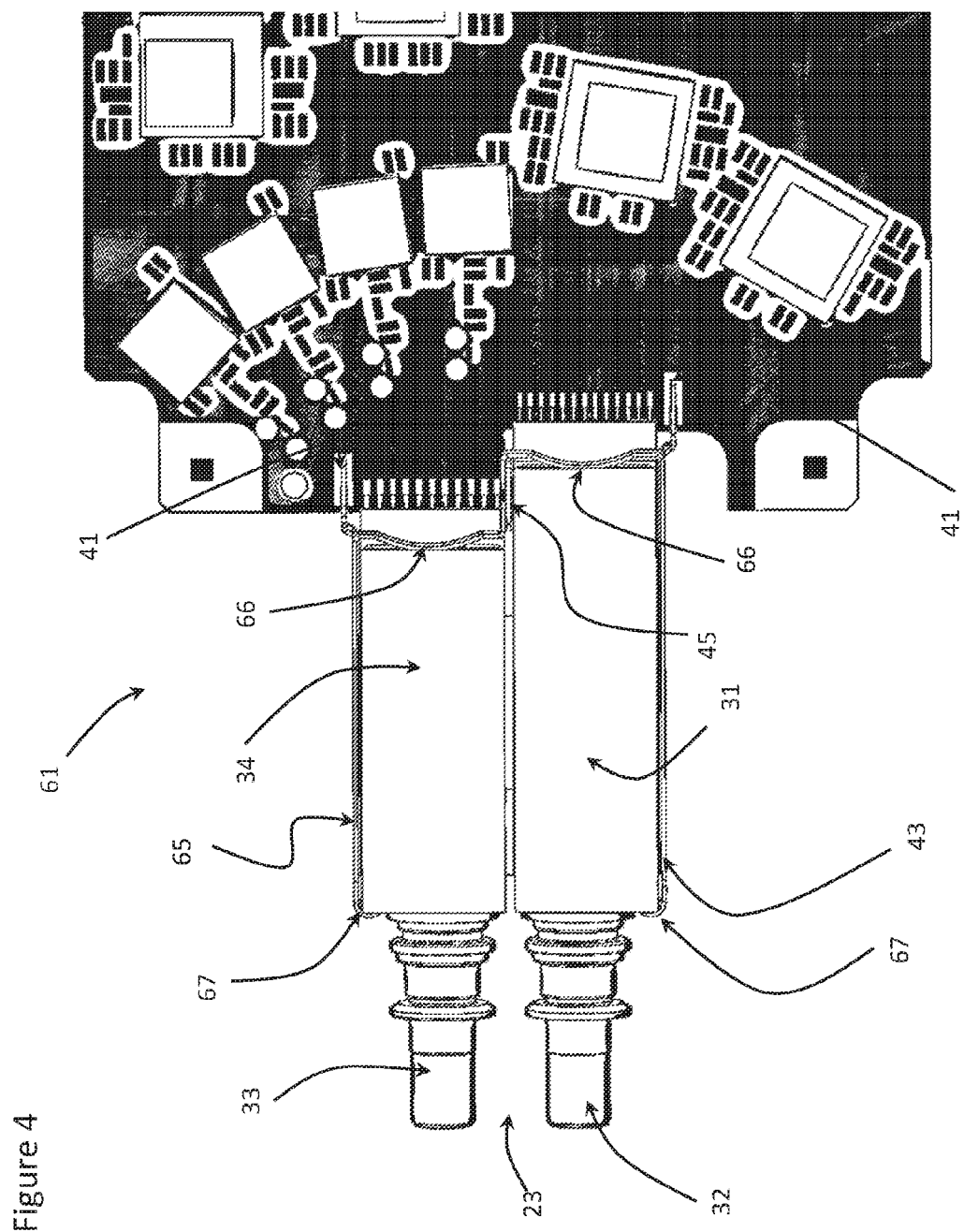
FIG. 4 is a bottom view of a transceiver assembly in accordance with an alternative embodiment of the present invention.
Figure 5:
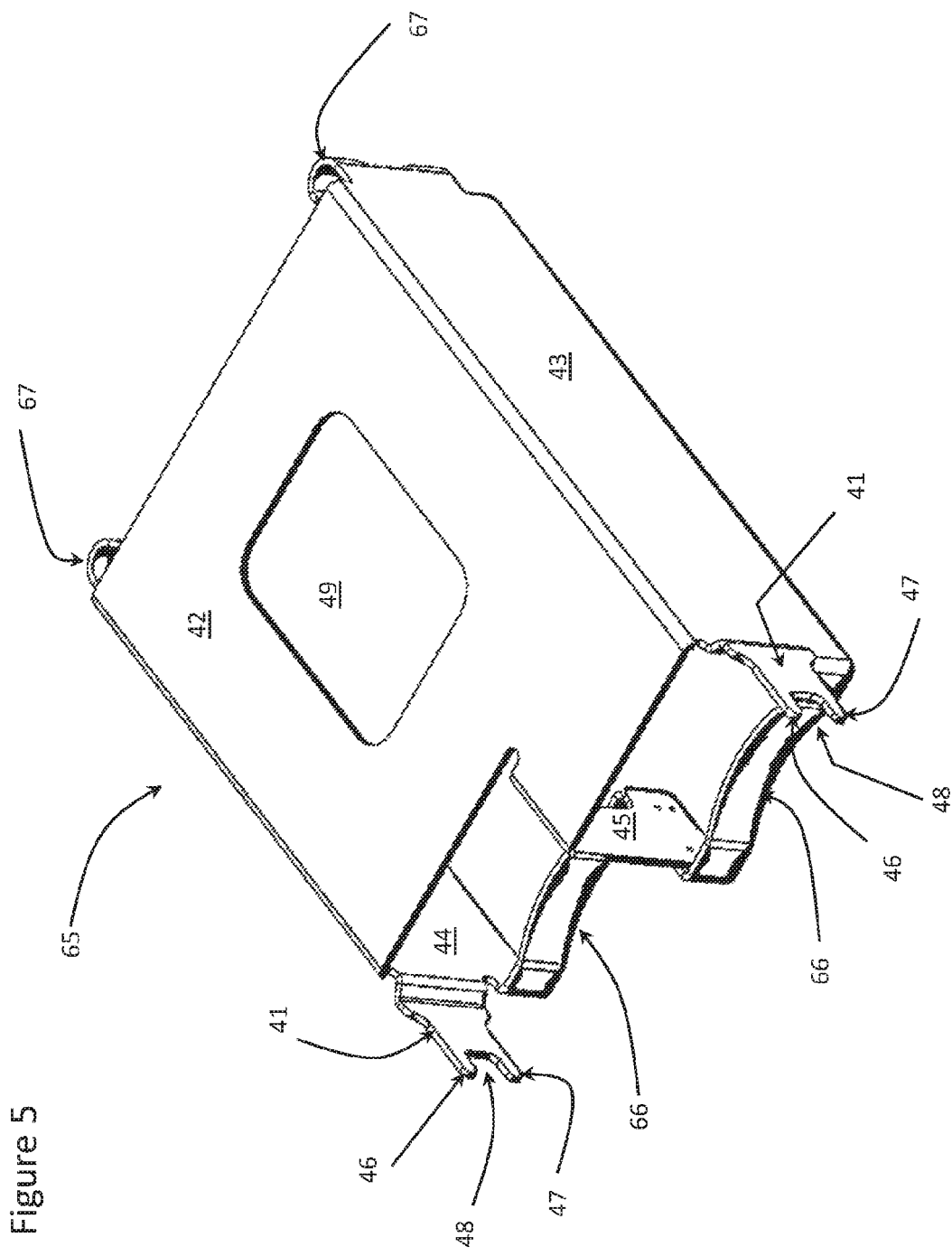
FIG. 5 is an isometric view of the OSA cage of FIG. 4, from above.
Figure 6:
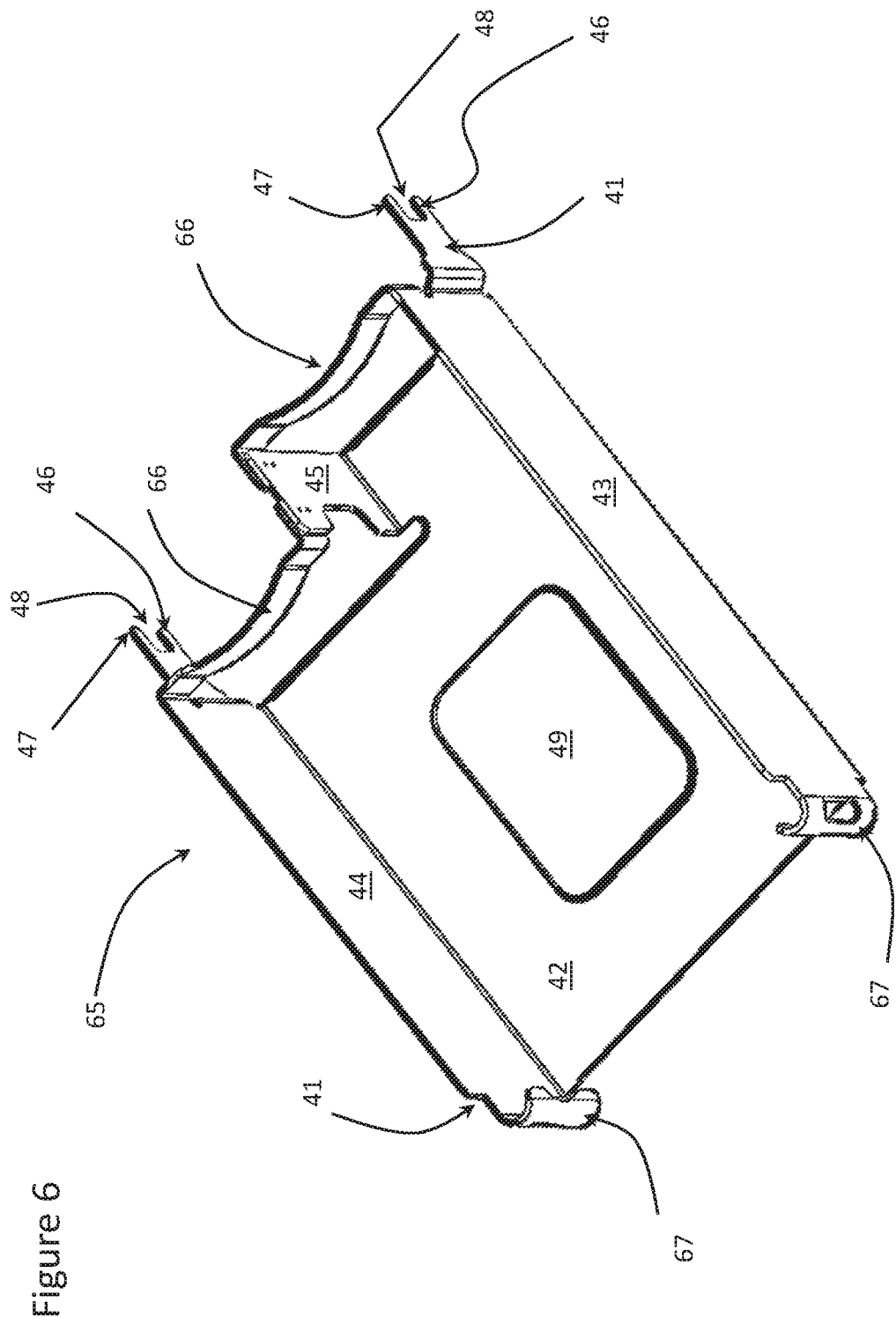
FIG. 6 is an isometric view of the OSA cage of FIG. 4, from below.

With particular reference to FIGS. 4 to 6, in the illustrated embodiments the OSA cage 25 comprises a substantially rectangular upper cover 42, and first and second rectangular side walls 43 and 44, respectively, extending parallel to each other and perpendicular to the upper cover 42. In the illustrated embodiments, the first side wall 43 is longer than the second side wall 44 due to the disparity in lengths between the TOSA 31 and the ROSA 34, i.e. the TOSA 31 is longer than the ROSA 34. Accordingly, the upper cover 42 can include an additional rectangular section extending from one end of the main section, and a short dividing wall 45 extending parallel to the first and second side walls 43 and 44, perpendicular to the upper cover 42, and along the side of the portion of the TOSA 31, which extends beyond the ROSA 34. Furthermore, the PCBA 26 also includes an additional rectangular section extending from one end of a main section for making up the difference between the lengths of the TOSA 31 and the ROSA 34.

The soldering tabs 41 extend outwardly from the side of each side wall 43 and 44, i.e. from the rear end of the OSA cage 25, preferably integral therewith, and include upper and lower fingers 46 and 47, respectively, separated by a notch 48. Each notch 48 has a width substantially the same or slightly wider than the thickness of the PCB 26, thereby enabling the PCB 26 to be fitted and received within the notches 48 before permanently fixing the two together, e.g. by soldering or some other fixing method or material. Since the first and second sidewalls 43 and 44, respectively, are of different lengths, the first soldering tab 41, extending from the first side wall 43, extends to the main section of the PCBA 26, while the second soldering tab 41, extending from the second side wall 44, extends to the additional rectangular section of the PCBA 26.

In the center of the upper cover 42, a large opening 49 is provided for aligning and adjusting the TOSA 31 and the ROSA 34. Through the opening 49, a simple tool can be used to align the OSAs inside the OSA cage 25, if necessary. The opening 49 has a length and width typically ⅓ to ¼ of the width and length, respectively, of the upper cover 42. The upper cover 42 can also include a plurality of holes 51 extending therethrough, e.g. in an at least 4×4 array pattern as shown in FIGS. 2 and 3, to provide adequate thermal dissipation. Alternatively, the opening 49 can be sufficiently large, as illustrated in the alternative embodiment of a transceiver 61 with an OSA cage 65 in FIGS. 5 and 6, to provide for sufficient cooling without the need for extra holes 51.

Ideally, the OSA cage 25 or 65 include clips, extending from the upper cover 42 or the side walls 43 and 44, for engaging both ends of the TOSA 31 and ROSA 34, and holding them in OSA cage 25. With reference to FIGS. 2 and 3, the clips comprise a pair spring clips 55, integrally formed with the upper cover 42, extending downwardly into contact with the electrical end of each of the TOSA 31 and ROSA 34, and a single spring clip 55, integrally formed with the upper cover 42, extending downwardly into contact with the opposite, optical end of both the TOSA 31 and ROSA 34. Providing a plurality of additional spring clips 55 is also within the scope of the invention. The spring clips 55, illustrated in FIGS. 2 and 3, are formed by bending an extension of the upper cover 42 downwardly at approximately 90°±10° and then folding an end section of the extension back upon itself forming an abutment surface free of sharp edges.

With reference to FIGS. 4 and 5, for the OSA cage 65, the clips comprise a leaf spring 66 extending across each opening at the electrical end of the OSA cage 25 for engaging the ends of the TOSA 31 and the ROSA 34 below the soldering tabs 41 and electrical leads 28 and 36. Ideally, one end of each leaf spring 66 is integral with the corresponding side 43 and 44 of the OSA cage 25, while the other end is fixed to the dividing wall 45. Typically, the leaf springs 66 are formed to include an arcuate section, with the midpoint of the arcuate section extending into the OSA cage 25 for engaging the TOSA 31 and the ROSA 34.

A curved clip 67, extending from each of the first and second side walls 43 and 44, is provided at the optical end of the OSA cage 25 for engaging the opposite ends of the TOSA 31 and the ROSA 34. Ideally the curved clip 67 are integral with the corresponding first and second side wall 43 and 44, with the outer free ends thereof bent back around for engaging the corresponding OSA 31 and 34.

A fixture that matches transceiver module design is used to assemble the OSA's 31 and 34, the cage 25 or 65 and the PCBA 26 together. The assembling sequence for the OSA cage assembly will be as following:

First, assemble the cage 25/65 with the OSAs 31 and 34 using the clips, i.e. spring clips 55 or leaf springs 65, to hold the OSA's 31 and 34 within the cage 25/65. Align and adjust the OSA's 31 and 34 using tools extending through the opening 49;

Second, align the OSA—cage assembly with PCBA 26 in the fixture by sliding the edge of the PCBA 26 into the notches 48 of the soldering tabs 41 with the OSA leads 28 and 36 aligned with corresponding trace leads on the PCBA 26;

Third, solder the soldering tabs 41 to the PCBA 26;

Finally, fix, e.g. solder, the OSA leads 28 and 36 of OSAs 31 and 34 to the PCBA 26.

By fixing the soldering tabs 41 prior to OSA leads 28 and 36, the cage 25/65 restricts the relative movement between the OSAs 31 and 34 and the PCBA 26 along the X, Y and Z directions. The force resulted from relative movement between the OSAs 31 and 34 and the PCBA 26 will be taken by the cage 25/65 first and then transferred to the OSA leads 28 and 36. Therefore, the connection between the OSAs 31 and 34 and the PCBA 26 is reinforced by the cage 25/65, i.e. the cage 25/65 acts as a stress relief for OSA leads. As such, the potential problem associated with OSA-PCBA connection area, such as PCBA solder joint fracture, PCBA pad lifting and OSA pin fracture etc, will be significantly reduced.

Ideally, the cage 25/65 are formed from a single piece of sheet metal with the first and second side walls 43 and 44 bent downwardly from the cover 42, perpendicular thereto. The material around the spring fingers 55 can be punched out from the cover 42, and then the spring fingers 55 can be folded over into position. The openings 49 and the holes 52 are simply punched out of the cover 42. The material around the soldering tabs 41 and spring fingers 66 and 67 are punched out at each end of the first and second sidewalls 43 and 44, and the spring fingers 66 are bent into position. The dividing wall 45 can be formed by cutting a section of the cover 42, and folding it downwardly parallel to the first and second side walls 43 and 44, thereby revealing the opening for the electrical contacts for the shorter ROSA 34, and defining the extended section of the cover 42, which covers the end of the TOSA 31

The present invention is ideally suited for use in a transceiver module with both the TOSA 31 and ROSA 34; however, the cages 25 and 65 can be used with any electro-optical module with one or more OSAs.

We claim:

1. A cage for at least one optical subassembly, the cage comprising:
    a housing comprising a cover and first and second side walls for covering a first optical subassembly (OSA);
    first and second tabs extending from the first and second side walls, respectively, for receiving an edge of a printed circuit board assembly (PCBA), which is electrically coupled to the first OSA; and
    spring clips extending from the housing for holding the first OSA in the housing,
    wherein the first side wall is longer than the second side wall to accommodate a length of the first OSA that is longer than a second OSA.

2. The cage according to claim 1, wherein the first and second tabs comprise first and second fingers with a notch therebetween for receiving the edge of the PCBA.

3. The cage according to claim 1, wherein the first and second tabs are integral with the first and second sides of the housing.

4. The cage according to claim 1, wherein
    the spring clips comprise first and second spring clips extending downward from opposite ends of the cover, and
    outer free ends of the first and second spring clips engage opposite ends of the first OSA, respectively.

5. The cage according to claim 1, wherein the spring clips are integral with the cover.

6. The cage according to claim 1, wherein the spring clips comprise a first leaf spring extending from the first side wall for engaging the first OSA.

7. The cage according to claim 6, wherein the first leaf spring is integral with the first side wall.

8. The cage according to claim 1, further comprising:
    a dividing wall, extending downward from the cover and parallel to the first and second side walls, forming first and second openings in an electrical end of the cage through which electrical connectors of the first OSA and the second OSA, respectively, extend.

9. The cage according to claim 8, wherein
    the dividing wall extends along an end section of the first OSA, which extends beyond the second OSA, and
    the cover includes a rectangular section extending to the end section of the first OSA.

10. The cage according to claim 8, wherein the spring clips comprise:
    a first leaf spring extending across the first opening from the first side wall to the dividing wall; and
    a second leaf spring extending across the second opening from the second side wall to the dividing wall for engaging the second OSA.

11. The cage according to claim 10, wherein
    the first leaf spring is integral with the first side wall, and
    the second leaf spring is integral with the second side wall.

12. A transceiver comprising:
    a transmitter optical subassembly (TOSA) for converting electrical signals into optical signals and transmitting the optical signals to an optical network, the TOSA including electrical leads extending therefrom;
    a receiver optical subassembly (ROSA) for converting optical signals into electrical signals and transmitting the electrical signals to a host device, the ROSA including electrical leads extending therefrom;
    a printed circuit board assembly (PCBA) including:
        trace leads directly fixed to the electrical leads from the TOSA and the ROSA;
        a laser driver connected to the TOSA via trace leads; and
        a post amplifier connected to the ROSA via trace leads; and
    a cage comprising:
        a housing including a cover, and first and second side walls for covering the TOSA and ROSA; and
        first and second tabs, extending from the first and second side walls adjacent to the electrical leads from the TOSA and the ROSA, respectively, fixed to an edge of the PCBA,
        wherein the first side wall is longer than the second side wall to accommodate a length of the TOSA that is longer than the ROSA.

13. The transceiver according to claim 12, wherein the first and second tabs comprise first and second fingers with a notch therebetween for receiving the edge of the PCBA.

14. The transceiver according to claim 12, wherein the first and second tabs are integral with first and second sides of the housing.

15. The transceiver according to claim 12, wherein the cage further comprises:
    spring clips extending from the housing for holding the TOSA and the ROSA in the housing.

16. The transceiver according to claim 15, wherein the spring clips comprise:
    first and second spring clips extending downwardly from an end of the cover engaging one end of the TOSA and the ROSA, respectively, and
    a third spring clip extending downwardly from the cover engaging opposite ends of the TOSA and the ROSA.

17. The transceiver according to claim 15, wherein the spring clips comprise:
    a first and a second leaf spring extending from the first and second side walls, respectively, for engaging the TOSA and the ROSA, respectively.

18. The transceiver according to claim 17, wherein the first and second leaf springs comprise an arcuate section, with a midpoint of the arcuate section abutting the TOSA and the ROSA, respectively.

19. The transceiver according to claim 12, further comprising:
    a dividing wall, extending downward from the cover and parallel to the first and second side walls, forming first and second openings in an electrical end of the cage through which electrical connectors of the ROSA and a TOSA, respectively, extend.

20. The transceiver according to claim 19, wherein
the dividing wall extends along an end section of the TOSA, which extends beyond the ROSA,
the cover includes a rectangular section extending to the end section of the TOSA, and
the PCB includes an additional section extending into contact with the electrical leads from the ROSA.

* * * * *